United States Patent Office 3,572,320
Patented Mar. 23, 1971

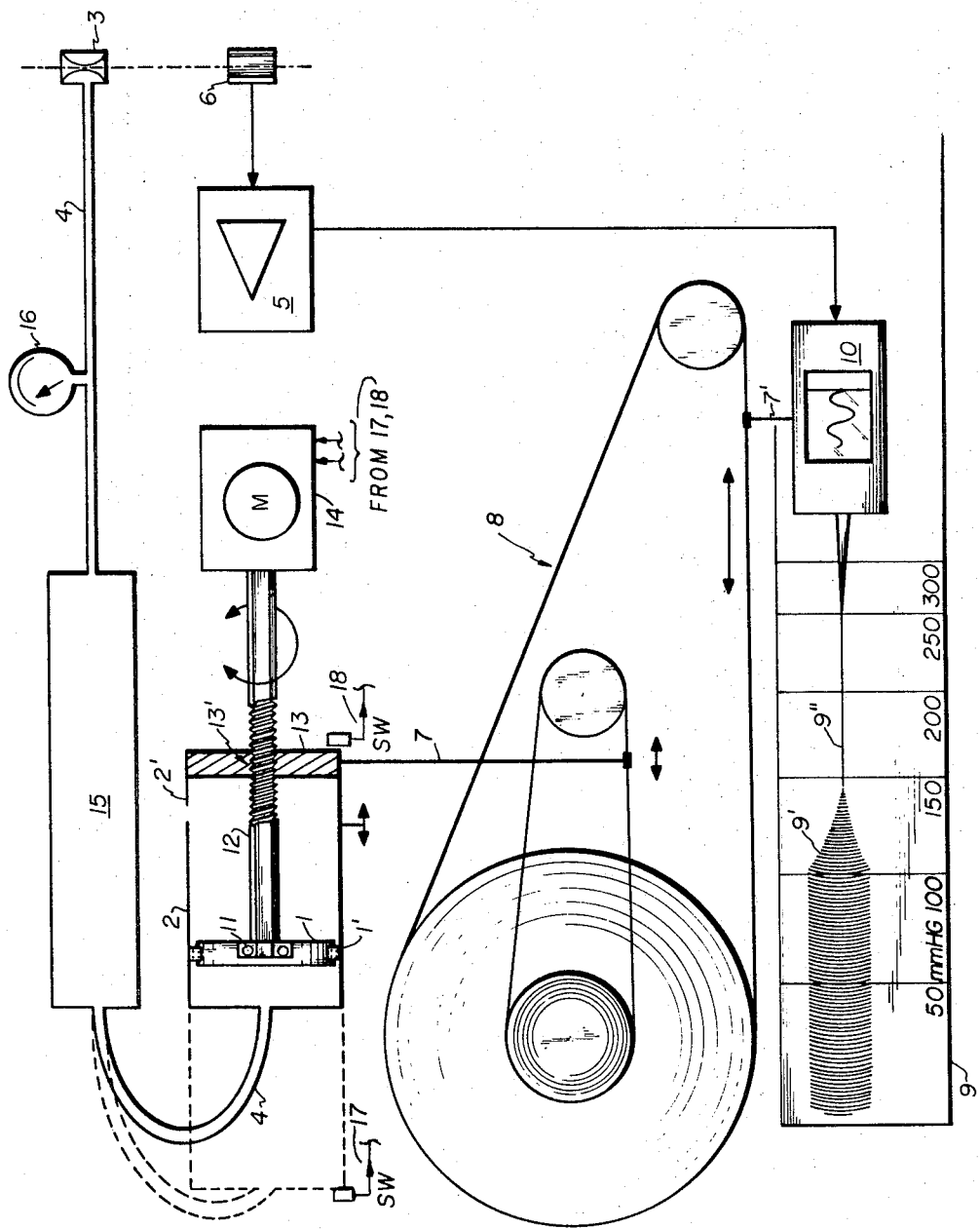

3,572,320
APPARATUS FOR BLOOD PRESSURE MEASUREMENT
Marcel Gerold, Binningen, and Hansjörg Tschirky, Basel, Switzerland, assignors to Hoffmann-La Roche Inc., Nutley, N.J.
Filed Apr. 26, 1968, Ser. No. 724,370
Claims priority, application Switzerland, May 12, 1967, 6,789/67
Int. Cl. A61b 5/02
U.S. Cl. 128—2.05                                      7 Claims

ABSTRACT OF THE DISCLOSURE

An apparatus for measuring blood pressure and heart rate in small animals comprising a pneumatic sleeve connected to a pressure generator and a piezoelectric pulse pickup attached via an amplifier to a galvanic recorder including a movable recording head, the pressure generator including a piston pump consisting of a piston and a cylinder (either the piston or the cylinder being displaceable) and a duct connecting the cylinder with the pneumatic sleeve. By way of transmission means fastened to the displaceable part of the piston pump, the recording head is synchronously displaced therewith for displacement over a recording paper for recording purposes.

BACKGROUND OF THE INVENTION

This invention is concerned with an apparatus for the indirect measurement of the blood pressure and/or heart rate, preferably in small animals and particularly in rats.

In the prior art techniques are known to measure the systolic blood pressure by registering the influx of the blood in an artery which has been made ischaemic. In implementing such techniques, an important criterion for investigating the opening of the pinched-off artery while counteracting the external resistance is the repeated occurrence of pulse waves, which pulse waves, however, can only be obtained with difficulty in the case of small animals. In particular, the fixing and the correct adjustment of the measuring cell used as the pulse-pickup on animals' tails causes great difficulties.

The purpose of the present invention is, in part, to avoid such difficulties as those noted above by ensuring a simple, faultless picking up of pulses in small animals, particularly in rats, as well as the registration of the heart rate as a function of the pressure.

To achieve the above, in a preferred embodiment of this invention, pulses are picked up by means of a piezo-crystal ring which, together with a pneumatic sleeve, is slipped in a simple manner over the tail of the animal in question. The pressure changes transmitted from the tail arteries to the piezo-crystal are transformed into electrical impulses and fed via an amplifier to a recording head of a galvanic recorder furnished with recording sheets graduated into pressure zones, the recording head by mechanical means adapted to synchronously follow the movement of a pressure aggregate connected to the pneumatic sleeve.

Other objects, capabilities and advantages in accordance with this invention will become apparent from the following detailed description, taken in conjunction with the accompanying drawing, illustrating a preferred embodiment of the invention.

There is shown in the drawing a schematic diagram of one embodiment of the apparatus in accordance with the present invention.

In referring to the drawing, there is shown a pneumatic sleeve 3 adapted to be altered by a pressure, which pressure is obtained through compression and expansion of air contained within the space enclosed between piston 1 and cylinder 2, the air within said space being conducted to sleeve 3 by way of duct 4 connected at the forward end of cylinder 2.

As illustrated, cylinder 2 is shown to be displaced along a horizontal axis in directions indicated by the arrows whereas piston 1 is fixably positioned, whereby tightness between the latter two members is ensured by a rubber sleeve 1'. To prevent twisting of cylinder 2 during such displacement, suitable guide means (not shown) may be provided. Centrally located in a housing 13 at the rear end of cylinder 2 is a threaded aperture 13' adapted to receive in threading engagement spindle 12, which spindle at one end is connected to piston 1 via a ball bearing connector 11 for firm but pivotable relative motion therebetween. Therefore, with rotation of spindle 12, cylinder 2 will be displaced in the manner depicted in the drawing and described above. A working embodiment of the invention might have a metric thread with a thread diameter of 10 mm. and a pitch of 1.5 mm.

In an alternative embodiment of the above apparatus (not illustrated), in accordance with the present invention, piston 1 could be displaceable and cylinder 2 would be fixed. In such a case, threaded spindle 12 engages into a housing, fitted with an internal thread, which housing would be connected fixably with the piston 1. Accordingly, the piston would be displaced in the direction of the arrows with rotation of threaded spindle 12.

In referring back to the embodiment shown in the drawing, threaded spindle 12 at its other end is coupled to a reversible electric motor 14 that may be switched from a speed of rotation of 52 r.p.m. to 104 r.p.m. The electric motor 14 through contact with limit switches 17 and 18 is automatically switched off at end points which might be defined in the preferred embodiment as locations at or about the displacement limits of cylinder 2 or of piston 1.

It is readily evident that extensive pressures will be developed in pneumatic sleeve 3; for example, with displacement of cylinder 2 about 89 mm. from left to right, the pressure in pneumatic sleeve 3, by observation of a pressure gauge 16, will rise from 0 to 300 mm. Hg. In view of the substantial variance in pressures, to ensure for extensive stability and linearity of the measuring device for the purpose at hand, the air space within duct 4 is substantially increased by inclusion of an expansion chamber 15. To prevent any loss of pressure which may occur during use, the pressure cylinder is, in its initial position, open to the external air by way of an aperture 2'.

An arm 7 at one end is fastened to cylinder 2 (or to the threaded housing of piston 1 in the alternative embodiment described above) and is connected at its remaining end with the input of a double belt-drive 8 having in the present embodiment a one to three input to output transmission ratio, to transmit three-fold the movement of arm 7, whereas the output of drive belt 8 is connected via arm 7' with a recording head 10 of a galvanic recorder mechanism. Of course, the belts making up belt-drive 8 might be provided with any known suitable means to avoid any possible slippage. When operating the presure corresponding to the position at a given time of cylinder 2 is transferred by a performing part of recording head 10, which synchronously follows the movement of the cylinder 2, onto the calibrated recording paper 9 of the type normally employed for a galvanic recorder, which paper is conveniently graduated into pressure zones as depicted. The pressure gauge 16 serves as a visual indicator for monitoring existing pressure being applied to the experimental animal via cuff 3.

Recording head 10 is adapted to register each: the pressure present in the pneumatic sleeve 3, which sleeve is placed on the experimental animal, and the pulse waves received from the experimental animal, the latter being achieved by use of a suitable piezoelectric pulse-pickup which preferably is tube shaped. The pressure variations brought about in such a piezo-crystal tube or ring, by pulse waves of the experimental animal, are transformed into electrical impulses of about 5 to 10 millivolts p.p. and fed via an amplifier 5 to the galvanic recorder including recording head 10.

To determine the heart rate of an experimental animal, by means of a special arrangement, the recorder needle of recording head 10 can be adapted to close an electrical contact on every second passage through the middle position, thus making it possible to readily permit the heart rate of the animal per unit time to be recorded by a known counting device such as a digital counter having zero-setting and fixed running time.

With change of direction of rotation of motor 14, the pulse waves may be recorded with decreasing pressures as well as with increasing pressures whereby the two pressures recorded can be compared with one another to analyze those occurrences of failure and reappearance of the sensed pulse wave. To facilitate and automate such recordings, with each direction of the motor, the recording paper may be shifted with activation of the relevant switch button at or about the contact with the end points at the limit switches 17 and 18 heretofore discussed.

With the assistance of the apparatus in accordance with the present invention, blood pressure and heart rate measurements can, for example, be carried out on rats as follows:

The rats, which before the measurement might have been kept in a warm box at 35° C. for about 40 minutes, are inserted into black plastic tubes fitted with air inlets from which only the tail of the animal is allowed to protrude. Pneumatic sleeve 3 (inside diameter about 12 mm.) is pulled over the tail down to its base. The pulse pickup (inside diameter of the piezocrystal ring 5 to 8 mm. depending on animal size) is pulled over the tail behind the cuff until it is tightly seated thereon. Then the motor is turned on and the recorder is set in operation. The recorder will subsequently move in accordance with the increasing pressure and trace (at right angles) the pulse waves 9'. As soon as the increasing pressure in the pneumatic sleeve restricts the tail arteries, the amplitudes of the traced pulse waves becomes smaller and after complete restriction of the arteries cessation of the pulse waves will occur and the amplitudes will disappear into a line tracing 9''. This point of amplitude change will indicate the maximal internal pressure of the artery, which corresponds to the systolic blood pressure. Thereafter, motor 14 is reversed by activation of a limit switch and the recording paper is shifted at the same time. The recorder will now initially trace a line with the decreasing pressure, and eventually will begin to again trace the pulse waves with the reappearance of the heart rate upon opening of the previously restricted arteries. This point will also indicate the systolic blood pressure thus enabling two measurements to be obtained in but a single operation.

As previously mentioned, the heart rate can be measured during the measuring procedure with the assistance of an electronic or an electromechanical counter. In practice, it would be desirable to switch on the counter for exactly 6 seconds so that the value read off the counter, when multiplied by 10, could yield the heart rate of the animal per minute.

In view of the above, it will readily be appreciated that the apparatus in accordance with this invention, makes it possible to undertake measurements described hereinbefore on conscious, normotonic or hypertonic small animals over any desired length of time and as frequent as desired. In this manner, pharmacological activities can be studied appearing immediately after application, after a latent period, or after repeated applications. Moreover, it is also possible to establish the oral activity of medicaments which is important for therapeutic purposes. With the instant invention, these measurements can be carried out on conscious animals simply and reliably with substantial exclusion of subjective factors.

Other solutions of the apparatus in accordance with the invention are also conceivable, as generally the individual components are not limited to the embodiment described here, but leave open wide scope for variants.

What is claimed is:

1. Apparatus for blood pressure measurement comprising a pneumatic sleeve, pressure generator means connected to said pneumatic sleeve and adapted to vary the pressure therein, an amplifier, a galvanic recorder including a movable recording head, a piezoelectric pulse-pickup connected via the amplifier to the galvanic recorder, said pressure generator means including a piston pump comprising a piston part and cylinder part and means for producing relative motion therebetween where one of said parts is displaceable, duct means connecting the cylinder with the pneumatic sleeve, means for coupling the displaceable part to the recording head for displacement of said recording head over a recording paper for print-out purposes, wherein said coupling means comprises transmission means having an arm fastened to said displaceable part and to the input of said transmission means, and a second arm fastened to the recording head and to the output of said transmission means.

2. Apparatus according to claim 1 wherein said transmission means comprises a double belt-drive including a first and second belt, said arm connecting said first belt to said displaceable part, and said second arm connecting said second belt to the recording head.

3. Apparatus for blood pressure measurement comprising a pneumatic sleeve, pressure generator means connected to said pneumatic sleeve and adapted to vary the pressure therein, an amplifier, a galvanic recorder including a movable recording head, a piezoelectric pulse-pickup connected via the amplifier to the galvanic recorder, said pressure generator means including a piston pump comprising a piston part and cylinder part and means for producing relative motion therebetween where one of said parts is displaceable, duct means connecting the cylinder with the pneumatic sleeve, means for coupling the displaceable part to the recording head for displacement of said recording head over a recording paper for print-out purposes whereby said pressure generator means includes an expansion chamber and a pressure gauge attached with said duct means between the cylinder and the pneumatic sleeve.

4. Apparatus for blood pressure measurement comprising a pneumatic sleeve, pressure generator means connected to said pneumatic sleeve and adapted to vary the pressure therein, an amplifier, a galvanic recorder including a movable recording head, a piezoelectric pulse-pickup connected via the amplifier to the galvanic recorder, said pressure generator means including a piston pump comprising a piston part and cylinder part and means for producing relative motion therebetween where one of said parts is displaceable, duct means connecting the cylinder with the pneumatic sleeve, means for coupling the displaceable part to the recording head for displacement of said recording head over a recording paper for print-out purposes, the electrical pulse-pickup is a tube shaped piezo-crystal.

5. Apparatus for blood pressure measurement comprising a pneumatic sleeve, pressure generator means connected to said pneumatic sleeve and adapted to vary the pressure therein, an amplifier, a galvanic recorder including a movable recording head, a piezoelectric pulse-pickup connected via the amplifier to the galvanic recorder, said pressure generator means including a piston pump comprising a piston part and cylinder part and means for producing relative motion therebetween where one of said parts is displaceable, duct means connecting the cylinder with the pneumatic sleeve, means for coupling the displaceable part of the recording head for displacement of said recording head over a recording paper for print-out purposes, whereby said piston is fixed and the cylinder is the displaceable part, wherein said means for producing relative displacement includes a motor means and a rotable threaded spindle, a threaded aperture at one side of the cylinder, ball bearing means for a connecting said piston to the threaded spindle which is extended in threading relation through said aperture for engagement with said motor means.

6. Apparatus according to claim 5 whereby the threaded spindle has a thread diameter of 10 mm. and a pitch of 1.5 mm. and the transmission ratio of the coupling means is one to three.

7. Apparatus according to claim 5 wherein switch means are provided in the course of said relative displacement for reversing said motor means.

References Cited

UNITED STATES PATENTS

| | | | |
|---|---|---|---|
| 2,168,890 | 8/1939 | Weiss | 128—2.05 |
| 2,371,244 | 3/1945 | Lax | 128—2.05 |
| 2,540,163 | 2/1951 | Brosene Jr. et al. | 128—2.05 |
| 2,571,124 | 10/1951 | Farrand | 128—2.05 |
| 2,660,164 | 11/1953 | Hasbrouck, Jr. | 128—2.05 |
| 3,051,165 | 8/1962 | Kompelien | 128—2.05 |
| 3,104,661 | 9/1963 | Halpern | 128—2.05 |
| 3,149,492 | 9/1964 | Weinberg | 128—2.05X |
| 3,229,686 | 1/1966 | Edmark, Jr. | 128—2.05 |

WILLIAM E. KAMM, Primary Examiner